(12) United States Patent
Junker (10) Patent No.: US 10,537,971 B2
(45) Date of Patent: Jan. 21, 2020

(54) MEASURING STEADY REST FOR SUPPORTING AND MEASURING CENTRAL WORKPIECE REGIONS GRINDING MACHINE WITH SUCH A MEASURING STEADY REST, AND METHOD FOR SUPPORTING AND MEASURING CENTRAL WORKPIECE REGIONS

(71) Applicant: Erwin Junker Maschinenfabrik GmbH, Nordrach (DE)

(72) Inventor: Erwin Junker, Buehl/Baden (DE)

(73) Assignee: Erwin Junker Maschinenfabrik GmbH, Nordrach (DE)

( * ) Notice: Subject to any disclaimer, the term of this patent is extended or adjusted under 35 U.S.C. 154(b) by 235 days.

(21) Appl. No.: 15/533,846

(22) PCT Filed: Dec. 8, 2015

(86) PCT No.: PCT/EP2015/078949
§ 371 (c)(1),
(2) Date: Jun. 7, 2017

(87) PCT Pub. No.: WO2016/091864
PCT Pub. Date: Jun. 16, 2016

(65) Prior Publication Data
US 2017/0368657 A1 Dec. 28, 2017

(30) Foreign Application Priority Data
Dec. 9, 2014 (DE) .................. 10 2014 225 295

(51) Int. Cl.
*B24B 49/04* (2006.01)
*B24B 5/42* (2006.01)
(Continued)

(52) U.S. Cl.
CPC ............... *B24B 5/421* (2013.01); *B23Q 1/76* (2013.01); *B23Q 17/225* (2013.01);
(Continued)

(58) Field of Classification Search
CPC ........ B24B 5/422; B24B 49/04; B24B 41/065
(Continued)

(56) References Cited

U.S. PATENT DOCUMENTS 5,058,468 A * 10/1991 Lessway ............... B23Q 1/76
279/121

FOREIGN PATENT DOCUMENTS

DE          69014883 T2    4/1995

OTHER PUBLICATIONS

International Search Report for application No. PCT/EP2015/078949, dated Feb. 29, 2016.

* cited by examiner

*Primary Examiner* — Robert A Rose
(74) *Attorney, Agent, or Firm* — Marshall, Gerstein & Borun LLP (57) ABSTRACT

The present invention relates to a measuring steady rest which has a device for supporting central workpiece regions, in particular, bearing points on shaft parts, in particular crankshafts, and a measurement device integrated therein for directly adjusting the measurement of the workpiece regions before and/or during machining of the shaft parts. The measuring steady rest is preferably designed in the form of a prism, the measurement device being arranged on the bottom of the prism between the lateral flanks of the prism. The present invention further relates to a grinding machine comprising such a measuring steady rest, and to a method (Continued)

for supporting and measuring central workpiece regions on such a grinding machine comprising such a measuring steady rest.

21 Claims, 8 Drawing Sheets (51) Int. Cl.
*B23Q 1/76* (2006.01)
*B23Q 17/22* (2006.01)
*B24B 41/06* (2012.01)
B24B 5/307 (2006.01)
B24B 47/20 (2006.01)

(52) U.S. Cl.
CPC ............ *B24B 41/065* (2013.01); *B24B 49/04* (2013.01); *B24B 5/307* (2013.01); *B24B 47/206* (2013.01)

(58) Field of Classification Search
USPC ..................................... 451/408, 5, 8–10, 49
See application file for complete search history.

MEASURING STEADY REST FOR SUPPORTING AND MEASURING CENTRAL WORKPIECE REGIONS GRINDING MACHINE WITH SUCH A MEASURING STEADY REST, AND METHOD FOR SUPPORTING AND MEASURING CENTRAL WORKPIECE REGIONS

CROSS-REFERENCE TO RELATED APPLICATIONS

This is the United States national phase of International Patent Application No. PCT/EP2015/078949, filed Dec. 8, 2015, which claims the priority benefit of German Application No. 10 2014 225 295.4, filed Dec. 9, 2014. Each of the foregoing is expressly incorporated herein by reference in the entirety.

BACKGROUND

The present invention relates to: a measuring steady rest for supporting and measuring central workpiece regions, in particular, bearing points on shaft parts, in particular, crankshafts; a grinding machine for grinding at least central workpiece regions, in particular, on crankshafts, with such a measuring steady rest; and a method for supporting and measuring central workpiece regions, in particular, on crankshafts, with such a measuring steady rest on such a grinding machine.

There are known steady rests for supporting central workpiece regions during machining of central and/or eccentric workpiece regions, in particular, bearing points on, in particular, crankshafts. These steady rests serve to additionally support so-called relatively soft workpieces, e.g., crankshafts, during the grinding in such a manner that introducing the grinding forces results in—to the greatest extent possible—no or at least very little deformation of the workpiece to be ground. In particular, with longer crankshafts, there therefore arises the need to adjust such steady rests during the grinding in order to receive the introduced grinding forces such that the grinding forces are distributed to the greatest extent possible at a plurality of main bearings of such a crankshaft, or, with other shaft parts, to the greatest extent possible at a plurality of points over the longitudinal extension thereof. Efforts to optimize the efficiency of the production process now usually involving using one or more grinding discs that grind at least partially in time-parallel the central shaft sections to be machined. Due to the limited space, therefore, use of a plurality of steady rests makes it difficult to provide yet another measurement device that, in terms of space, will collide with neither the grinding disc(s) nor the steady rests. One solution that, in this context, has been provided if measurements are to be taken during grinding is to interrupt the grinding process and then measure the currently-achieved diameter. This does not constitute actual in-process measurement. Often, steady rests from the company A OBOTECH Systems Inc are used on grinding machines for grinding crankshafts. These known steady rests usually have three jaws, which usually have a PCD (polycrystalline diamond) coating or CBN (cubic boron nitride) coating at the application against the bearing point. Steady rests having three jaws have an advantage in that each bearing point to be supported is "clamped", so to speak. Thus, a workpiece is clamped in a self-centering manner in the position thereof, and the jaws are advanced in the direction of the workpiece center, i.e., centrically with respect to the diameter of the respective central workpiece section. The movements of the individual steady rest jaws are permanently mechanically coupled, which leads to a relatively complicated mechanical system. However, such steady rests only make sense to use if the bearing points to be machined have already been relatively well pre-machined so that the steady rest reliably abuts thereagainst and can support. Tracking the steady rest during the grinding process is therefore burdensome and difficult during production due to the aforementioned reasons. The permanent mechanical coupling of the three jaws of the known steady rest requires relatively significant forces to be assumed during infeeding, which may lead to pronounced track marks on the bearing point to be supported. So-called two-point steady rests, with which the supports are optionally also previously PCD-coated, are fed in with CNC axes. Use of two separate CNC axes further raises the construction complexity of such steady rests and thus the costs thereof. The two support points and/or support regions of such known two-point steady rests are usually arranged at right angles to each other, wherein one such steady rest is generally arranged opposite the grinding disc so that the grinding forces can be absorbed.

Steady rests with which two support points are arranged with positive control are already known, such as in U.S. Pat. No. 6,257,972 B1. The two supporting points of the known steady rest are supported against a third opposite supporting point. The individual steady rest support elements are either fastened by means of stops or installed at a finish-ground bearing. Tracking of the steady rest during grinding of the steady rest position is not intended and not even possible.

DE 10 2011 015 205 B3 also discloses a two-point steady rest having two supporting parts arranged fixedly relative to one another. Such a known steady rest is used to horizontally and vertically support a workpiece, and has two supporting members arranged at a lateral distance from each other that are adjustable with respect to the workpiece. Such known steady rests lead only to limited applications, at best only inadequately available for many of today's applications, especially with respect to the true-running accuracy that can be achieved. These known steady rests are alike in needing to be retracted not only for the purpose of loading and unloading a new workpiece due to the relatively large space requirements thereof, but also for the purpose of measurement. Separate measurement devices, which are usually pivoted relative to the workpiece region to be measured, have additional inaccuracies in the measurement result due to the movement members required therefor. What is more, true in-process measurements are hardly possible with such devices.

This is especially problematic either if deviations in the cylindricity are present in the longitudinal direction of the workpiece region to be measured/machined, or if there is a desire to measure precisely such inaccuracies, because in such instances, the measurement device must measure the component to be measured or the workpiece region to be measured at a plurality of planes adjacent to one another in the longitudinal direction. For grinding of shaft parts and, then, in particular, bearing points on crankshafts, measurement devices from, for example, the companies Marposs S.p.A. or also JENOPTIK Industrial Metrology German GmbH are often used.

DE 694 13 041 T2 also discloses a measurement sensor of the company Marposs S.p.A., for controlling linear sizes. This measuring device can be used to measure inner diameters of holes as well as outer diameters. A movable sensor in the form of a spherical element is provided for this purpose, wherein deflections are transmitted to the spherical element by means of an additional element. With this known measuring device, the spherical element is in contact with an abutment surface over which the element is movable in the oblique direction, wherein the abutment surface is concave in the cross-section thereof, this concavity serving as a seat for the spherical element and guiding same in the oblique direction.

DE 33 36 072 C2—which was also filed by the company Marposs S.p.A.—also describes a sensing device for measuring linear dimensions. Here, too, the measurement is performed with known sensing heads for measuring external dimensions as well as internal dimensions in one plane, perpendicular to the longitudinal axis of the finished workpiece region to be measured. However, there is no description of measuring shape deviations or profilings in the longitudinal direction of the central workpiece section.

In addition, the prospectus "MOVOLINE In-Prozess-Messtechnik" of the company Jenoptik describes such an in-process measurement technique for measuring machined workpiece regions, including continuously measuring these dimensions during machining in order to adaptively control the grinding process on the basis of the measured workpiece parameters, as well as optionally using these measurement devices in order to control the circularity (see the measurement systems DF500 or DF700, p. 15). With this known measurement system, there is also a description of working with two measuring heads in the sense of an in-process measurement in order to determine outer diameters. Even if the shape dimensions are measured after complication of the grinding or a grinding process step but are not used for adaptive control, then this measurement system, too, necessitates additional space, existing only to a limited extent on the grinding machine for such highly-complex components as a crankshaft.

Also known are steady rests with which already-known measurements can be performed on the workpiece to be supported. DE 102 09 371 A1 discloses a quick-centering steady rest in which a measurement system is arranged facing away from the actual support point of the steady rest, by means of which measurement system it is intended to be possible to indirectly measure the supported workpiece region. However, this requires first locking the measurement system in the respective spindle sleeve to null or to a base level, because of the centering after the steady rest has been placed against the surface of the workpiece.

DE 690 883 T2 also discloses a steady rest with remote measurement. The known steady rest entails a three-jaw steady rest with self-centering action, with which the respective jaws of the steady rest are connected via a linkage to a work body, longitudinal displacement thereof in turn constituting the actual measurement result of the supported workpiece region. Here, too, this therefore entails indirect measurement of the supported workpiece region, the accuracy of which is limited by the many intermediary movement members. Especially for today's pursuit of the highest accuracies with many workpieces to be produced, limits should be set first and foremost with use of in-process measurements with this known steady rest with remote measurement.

All of the known additional systems with grinding of, in particular, crankshafts, i.e., systems for additionally supporting, i.e., the steady rests, such as also systems for measuring preferably before or during the grinding, are alike in either requiring additional measurement devices or in only being able to perform measurements discontinuously. With known steady rests, the actually measurements can only be realized indirectly, which includes loss of measurement accuracy.

GENERAL DESCRIPTION

The present invention addresses the problem of providing a steady rest for reliably, actively supporting a central workpiece region, with which the central workpiece region can be measured precisely without requiring additional installation space and with which a reliable in-process measurement is possible, i.e., without needing to interrupt the actual grinding process in order to perform the measurement. Also to be provided are a grinding machine comprising such a steady rest, and a method for supporting and measuring central shaft parts on a grinding machine with such a steady rest.

Use of the term "central bearing point" hereinafter is to be understood also to mean central workpiece regions, which—though central—are not necessarily a bearing point on the workpiece or shaft part. Similarly, the term "shaft part" is also to be understood to mean a workpiece that has a central workpiece region.

According to a first aspect of the present invention, provided is a steady rest that—in addition to the conventional device for supporting—also has a device integrated therein for direct advancement onto and measurement of the central workpiece regions, in particular, bearing points on shaft parts, in particular, crankshafts. Such a steady rest is called a measuring steady rest hereinbelow. The measuring steady rest according to the present invention has a device for supporting central workpiece regions, in particular, bearing points on shaft parts, in particular, crankshafts, before and/or during the machining of the shaft parts, with an integrated measurement device for directly and preferably simultaneously measuring the workpiece regions. The term "directly measuring" is to be understood here to mean that the measurement device located within the support region of the measuring steady rest directly contacts the surface of the central workpiece region to be measured.

The measuring steady rest according to the present invention advantageously ensures that, on the one hand, measuring a workpiece region to be machined that is supported by a steady rest does not require any additional space in a machine tool for a measurement device, so that it surprisingly becomes possible with the measuring steady rest according to the present invention—without losing space in the machine—not only to support but also even to measure the workpiece region being machined, by using the measuring steady rest according to the present invention. This, on the other hand, makes it possible to achieve a reliably high accuracy through the direct measurement of the shaft part to be machined.

Preferably, the measuring steady rest according to the present invention for supporting and measuring central workpiece regions before and/or during the machining of both central and/or eccentric workpiece regions or even other regions on a shaft part is configured so that the measuring steady rest can be brought out of a retracted position in order to grind, and brought into a support position on the workpiece region in order to support the workpiece region. The measuring steady rest preferably comprises at least two supporting parts that can be fed in against the workpiece region and that support the workpiece region, with the steady rest placed thereagainst, at peripheral regions respectively spaced apart from one another. The supporting parts form an opening angle to one another at respective lateral flanks of a prism that opens in the manner of a fork and is arranged on a steady rest arm. The supporting parts are arranged in fixed positions relative to one another and the steady rest arm, and—in the support position of the measuring steady rest—below center with respect to the longitudinal axis of the workpiece region. This arrangement is provided here such that an angle bisector formed between two supporting parts has a fixed acute angle to a vertical line passing through the longitudinal axis of the workpiece region. The steady rest arm is fed in, in a CNC-controlled manner, against the workpiece region along this angle bisector, on which the measurement device is arranged with regard to the longitudinal axis thereof in order to measure the workpiece region. This means that the longitudinal axis of the measurement device aligns with the angle bisector, i.e., the infeed axis XL of the steady rest against the workpiece region to be supported.

In and of itself, such a steady rest in the form of a prism has the "disadvantage" of not being self-centering. This means that the steady rest does not automatically adapt to the diameter of the central workpiece region to be supported. This disadvantage is now compensated for by measurement of the diameter of the central workpiece region on placement thereagainst of the steady rest, in order to be able to produce the most precise possible diameter of the workpiece regions. Integrating a measurement device into the steady rest thus makes it possible to compensate for a normally quite simple and possibly not all of the requirements of the requirements provided for the accuracy of the machining process, while at the same time also saving installation space in the machine for a separate, distinct measurement device. Preferably, the measuring steady rest can be moved between a retracted position and the support position on the XL infeed axis thereof. The measuring steady rest is configured so that the steady rest arm thereof can be moved by means of only one servomotor working on a threaded spindle. The XL infeed axis of the steady rest coincides, according to the present invention, with the angle bisector and constitutes a separate CNC-controlled infeed axis.

In order to ensure the most optimal possible application through the supporting parts, even against an unfinished contour of the workpiece to be ground, the supporting parts are configured—depending on the intended use and qualitative configuration of the contour to be supported of the workpiece region—so as to be planar, convexly curved, or divided by means of a center groove into at least two supporting sections. Further preferably, the supporting parts are provided with CBN or PCD surfaces. This ensures especially low-wear sliding of the supporting parts on the surface to be supported of the workpiece region when the workpiece is rotating. Since the diameter may vary in the direction of the longitudinal axis of the central workpiece region, especially with an unfinished contour of the workpiece region to be ground or to be supported, it is further preferable to provide that the supporting parts are mounted onto the lateral flanks of the prism so as to pivot freely about an axis running perpendicular to the longitudinal axis of the workpiece region. Irregularities in the surface contour can thus be canceled out, at least better than if the supporting parts were fixedly attached to the respective lateral flanks of the prism of the measuring steady rest.

Preferably, the measurement device—preferably arranged between the supporting parts of the prism of the steady rest—comprises a probe pin arranged so as to be movable or displaceable on the angle bisector relative to the CNC-controlled infeed of the steady rest arm along the XL axis. Further preferably, the measurement device is able to move independently of the CNC-controlled infeed of the steady rest arm. This makes it possible to adapt to different measurement tasks on placement of the steady rest against a workpiece region to be supported, both of the unfinished measure and of an intermediate measure, as well as a final measure. Certain remaining contour inaccuracies with an intermediate measure—as is, of course, even more the case with the unfinished measure of the central workpiece region to be machined—can be compensated for by the additional measurement device in terms of the separate problems with supporting on a not-yet finish-ground contour for a steady rest. Moving the probe pin in the direction of the longitudinal axis of the measurement device signifies that the probe pin moves on the X-axis of the measuring steady rest and is thus also arranged in alignment with the angle bisector. Thus, the measuring steady rest is arranged below center with respect to the shaft part, with regard to the substantially opposite grinding disc. The measuring steady rest according to the present invention is then advantageously a very compact device that both ensures support against the workpiece region in the form of a more or less conventional steady rest, which, however, simultaneously makes it possible to measure the workpiece, i.e., at the supporting point, without an additional measurement device requiring installation space at the central workpiece point to be supported and to be ground. It is, namely, surprisingly been shown that the measurement device integrated into the steady rest can still very reliably and very accurately fulfill the measurement task thereof, despite the relatively great support forces in some operations that a steady rest conventionally must absorb.

According to a second aspect of the present invention, provided is a grinding machine for grinding central and/or eccentric workpiece regions on workpieces, in particular, bearing points of, in particular, crankshafts, which comprises the measuring steady rest according to the present invention with the features according to any of claims 1 to 5, and is provided with a control device by means of which the measuring steady rest can be placed against a central workpiece region before and/or during grinding performed by means of a grinding disc, or after the completed grinding of a workpiece region, it being possible to feed in the grinding disc up to a finished size of the workpiece region by means of the CNC control thereof. The measuring steady rest is configured as a support prism, and such that the infeed movement thereof—which is also CNC-controlled—takes place on the workpiece region to be supported along the angle bisector of the opening angle of the support prism. The measurement device is arranged on the angle bisector, the longitudinal axis thereof being aligned with the angle bisector. Configuring the grinding machine with CNC control for the grinding disc (X-axis) and the CNC control (XL axis) of the measuring steady rest makes it possible both to control the infeed of the grinding disc and to feed in the measuring steady rest in a process-optimized manner and with consideration given to the respective positions of the grinding disc and measuring steady rest. In particular, it is preferably possible for the exact positions of the grinding disc and the measuring steady rest to be coordinated with one another in accordance with the measurement result from the measurement device when the central workpiece region is being measured.

Preferably, the measurement device transmits measurement signals on the diameter of the workpiece region for the infeed position of the measuring steady rest against the bearing point or against the workpiece region to the control device, wherein the infeed positions of the measuring stead rest are controlled on the basis of these measurement signals. Preferably, in addition, the control device is also configured so that the X-axis infeed position of the grinding disc can be controlled on the basis of the measurement signals. Thus, adjusting between the infeed of the grinding disc and the infeed of the measuring steady rest makes it possible to always have the optimal placement force of the measuring steady rest against the machined workpiece region. Optimal adjustment is to be understood herein to mean that the forces introduced into the workpiece by the grinding disc, as well as the force of the steady rest on the workpiece, can be adjusted in order to, for example, optionally slightly overpressure so that an optimal cylindricity that is aligned on the longitudinal axis of the central workpiece region can be produced after the grinding and after or in the result of the measurement process.

Preferably, the measurement device can be changed along the angle bisector relative to the infeed movement of the measuring steady rest. Further preferably, the CNC-controlled infeed of the grinding disc is accomplished synchronously with that of the measuring steady rest. With synchronous infeed of the grinding disc and measuring steady rest, an optimal and high-precision machining result requires that the measurement results of the measurement device of the measuring steady rest be transmitted to the control device and assessed there as appropriate.

It is, however, further preferably also possible for the measuring steady rest to be tracked to the X-axis infeed position of the grinding disc by means of the control device. When the measuring steady rest is tracked to the X-axis position of the grinding disc, the measuring steady rest reacts, so to speak, to the achieved infeed position of the grinding disc, with the respective support position thereof on the workpiece region that is to be supported and measured. It is especially advantageous when the angle bisector forms such an angle to the vertical line that resulting forces applied during the grinding press the workpiece region into the support prism in a position-fixing manner at the supporting parts.

If the measuring steady rest is tracked to the X-axis infeed position of the grinding disc, then, preferably, the support position is an end position of infeeding, at which the support prism abuts in the end position against a finish-ground workpiece region.

In summary, it should be noted that the grinding machine according to the present invention comprising the measuring steady rest according to the present invention overcomes the problem where the limited available space—which by the provision of an additional measurement device that is independent of the steady rest, as is common in the prior art—is not further restricted; rather, the measurement device integrated into the measuring steady rest not only provides significant advantages in terms of space over the known devices in the prior art, but also creates the possibility for a measuring steady rest to be used both for an unfinished contour and for an intermediate contour as well as for a finish-ground contour, and, at the same time, for optimal machining results to be achievable with the direct measurement of the respective current diameter data on the machined central workpiece region. According to a third aspect of the present invention, provided is a method for supporting and measuring central workpiece regions, in particular, bearing points on shaft parts, in particular, a crankshaft, before and/or during the machining of central and/or eccentric workpiece regions by means of a grinding disc, which has an infeed axis CNC-controlled by a control device, in which method a measurement device is brought into contact with the workpiece region to be measured, at a measuring steady rest according to any of claims 1 to 5 arranged on a steady rest arm, on a grinding machine according to any of claims 6 to 13, by means of a CNC axis of the steady rest arm, and the still not yet machined, partially machined, or finished workpiece regions are measured by means of the measurement device integrated into the measuring steady rest.

Preferably, in the method, the measuring steady rest is placed with the supporting parts thereof, arranged in the prism, at the workpiece region to be supported in such a manner that this workpiece region is overpressured by a sum defined with respect to the central longitudinal axis of the shaft part and thereafter the measuring steady rest supports the workpiece region on the current diameter thereof. The so-called overpressuring of the workpiece region means that not only the steady rest applies a reactive support force onto the shaft part to be machined, but additionally an active pressing force is achieved for bringing about a deliberate deformation of the longitudinal axis of the component, in the sense of a slight deflection from the bend null line.

It is furthermore also preferably provided that the measuring steady rest is retracted after the workpiece region has been measured by such a small amount to the CNC infeed axis (XL infeed axis) thereof that the measuring steady rest supports the workpiece region on the current diameter thereof, i.e., without overpressuring.

"Whether or not the measuring steady rest overpressures the workpiece region depends solely on what measure the measurement device has measured at the unfinished contour or intermediate contour of the workpiece region. Further preferably, with the method according to the present invention, the measuring steady rest is tracked by means of a control device on the basis of measurement signals provided thereto by the measurement device to the current diameter of the central workpiece region, up to the finished dimensions thereof. This is a continuous measurement of the current diameter, which is an in-process measurement.

The measurement may also, however, be executed such that the grinding feed is halted during the grinding of the bearing point, and the diameter is measured at the bearing point. Then, the bearing point is ground to the differential dimension determined by the integrated measurement device, up to the finished dimension. Preferably, the measurement may also be performed with intermittent grinding feed and a low lifting amount of the grinding disc from the bearing point currently to be ground.

In order to enhance the accuracy of the machining, an additional circularity correction to the actual infeed value of the grinding disc, in the manner of an overlay, may be further preferably embossed by means of the control device on the CNC-controlled X infeed axis of the grinding disc. It is thus possible to further improve the circularity in the machining result, wherein the respective machining process can be optimally monitored and controlled with the measurement device integrated into the measuring steady rest, through the consequently-realized in-process measurement.

Preferably, in a first version, the measuring steady rest—with a non-rotating shaft part—is moved on the CNC-axis of the steady rest arm thereof (XL infeed axis) toward the workpiece region to be machined to such an extent that the measurement device measures a measurement signal of the diameter of the workpiece region, i.e., without the measuring steady rest supporting the workpiece region. The measured measurement signal is transmitted to the control device. Thus, with this first version, the measurement device within the measuring steady rest is used in order to obtain a first value of the diameter, in particular, of the unfinished contour of the central workpiece region, without the steady rest being at all in contact with this workpiece region.

According to a second variant, preferably, the measuring steady rest—with a rotating shaft part—is moved on the CNC axis of the steady rest arm thereof toward the workpiece region to be machined with moderate infeed to such an extent that the workpiece region is supported, i.e., the measuring steady rest is in contact with the workpiece region, and the measurement signal of the measurement device no longer changes. The measurement signal is then transmitted to the control device. That is, the measurement signal is only transmitted to the control device when the measurement signal of the measurement device no longer changes. In this version, it is particularly clear what advantages arise that the measurement device is integrated into the measuring steady rest and the measurement signals of the measurement device are immediately put to use for controlling the infeed of the measuring steady rest. Finally, preferably, according to a third version, the measuring steady rest—with a rotating shaft part—is fed in on the CNC-axis of the steady rest arm thereof as far as a predetermined lower tolerance limit of the workpiece region to be machined. The measurement device only measures the diameter of the workpiece region when this placement position is achieved, and transmits the measurement signal corresponding to this diameter to the control device.

Finally, preferably, provided is a method wherein the steps according to claim 19 and according to claim 20 are performed one after the other. For certain applications, the sequential performance of these respective steps is especially advantageous, which may come into play, in particular, if the workpiece region to be machined has a relatively coarse unfinished contour. After the measurement values have been transmitted from the measurement device to the machine control, the steady rest can be fed in to the bearing point on the exact bearing diameter.

In order to obtain better placement of the diameter to be measured in the support prism, it is provided in another preferred embodiment that the steady rest is equipped with a pivot lever that additionally actively presses the workpiece into the support prism.

BRIEF DESCRIPTION OF THE DRAWINGS

Other advantages, configurations, and details of the present invention shall be described now hereinbelow, through the following drawings, with reference to embodiments. In the drawings.

DETAILED DESCRIPTION

Figure 1:
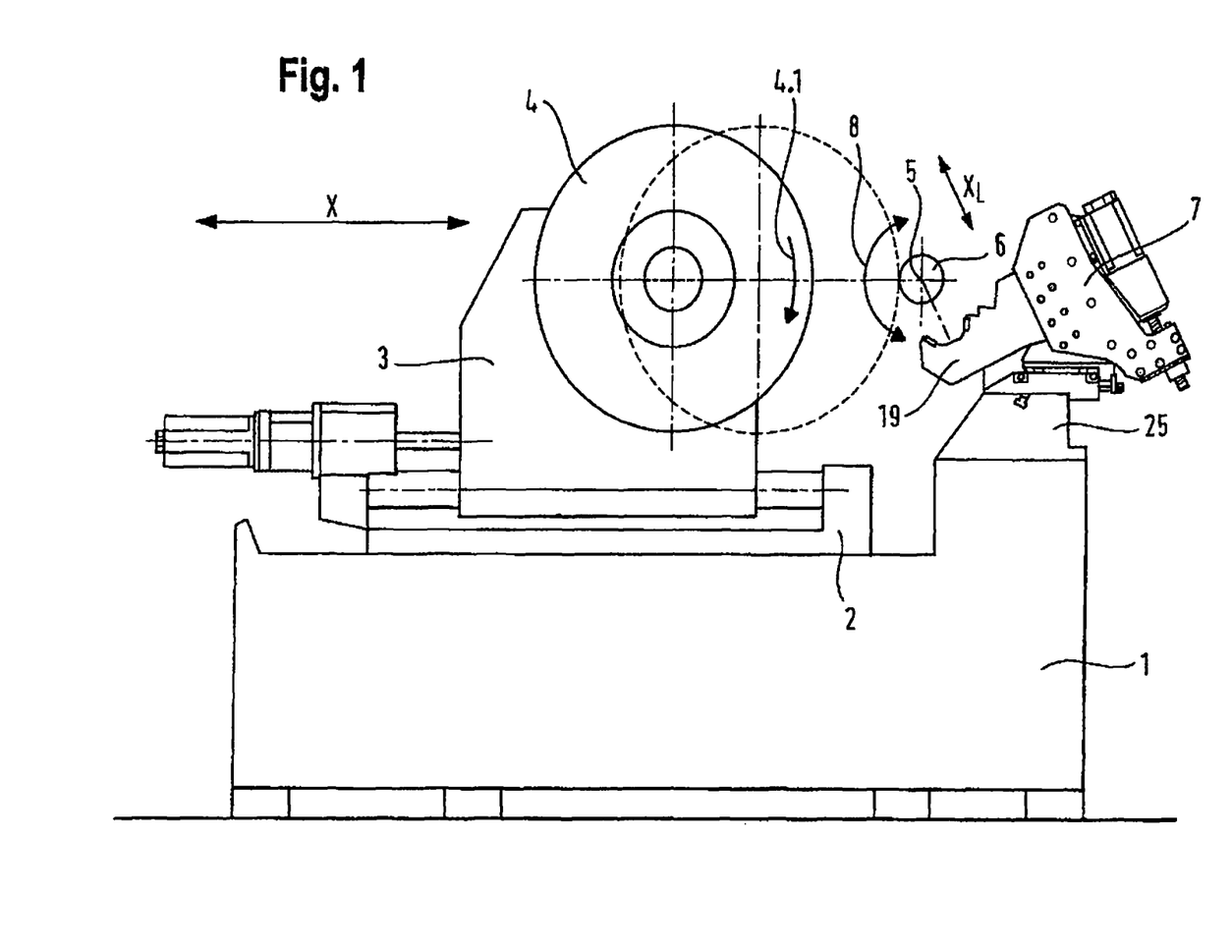
FIG. 1 illustrates a basic design of a grinding machine having an arranged two-point steady rest without a measurement device depicted.

FIG. 1 illustrates a side view of the basic design of a grinding machine with a two-point steady rest in the form of the measuring steady rest according to the present invention, with which the measurement device is not marked for the purpose of simplicity of depiction. A machine bed 1 bears a cross slide 2 for CNC-controlled movement of a grinding disc 4 mounted on a grinding spindle head 3 to feed in same against the workpiece 6 to be ground, which has a central longitudinal axis 5. The workpiece 6 represents a shaft part with which the central longitudinal axis 5 refers to the workpiece region 9 to be machined. The grinding disc 4 is shown in the solid line in the retracted position out of engagement with the shaft part 6 to be ground, wherein the direction of rotation of the grinding disc is shown in the interior thereof in the form of a curved arrow 4.1. In the dashed representation, the grinding disc 4 is shown in engagement with the shaft part 6 to be ground.

The grinding spindle head 3 is embodied in a known manner in cross slide construction, whereby it is possible for the grinding spindle head to be fed in with the grinding disc 4 parallel to the longitudinal center axis 5 of the central workpiece region 9 to be ground of the workpiece 6, i.e., the axis of rotation thereof, and perpendicular to this central longitudinal axis 5. The infeed is performed over the X-axis. The workpiece headstock (not shown) is mounted in the front region of the grinding machine on the machine bed 1, on a grinding table 25, which also accommodates the workpiece drive 8—represented by the curved arrow—for the workpiece, a tailstock 28 (see FIG. 7), and a measuring steady rest 7 according to the present invention for supporting the workpiece against a bearing point and directly measuring same. Directly measuring is understood here to mean that the measurement device 30 (see FIG. 2), integrated into the measuring steady rest 7, is brought with the probe pin thereof directly into contact with the surface of the workpiece region 9 to be measured, and thus directly absorbs a corresponding measurement signal on the surface of the workpiece region 9. FIG. 1 illustrates the measuring steady rest in a position with respect to the workpiece 6 in which the workpiece is not supported. Generally, the measuring steady rest, for supporting and measuring, is brought into contact with the workpiece 6 if the grinding disc—as illustrated in the dashed representation in FIG. 1—for grinding is engaged with the workpiece. If the measuring steady rest, with the supporting parts thereof for implementing the two-point support thereof, is approached against the workpiece region below center for supporting and measuring same, the grinding disc presses the workpiece through the direction of rotation 4.1 in a position-fixing manner into the prism of the steady rest. The measuring steady rest 7, which has a steady rest arm 19 on which the actual prism-like configuration of the measuring steady rest is arranged, is moved on a CNC-controlled infeed axis. This CNC-controlled infeed axis is labeled XL in FIG. 1.

Figure 2:
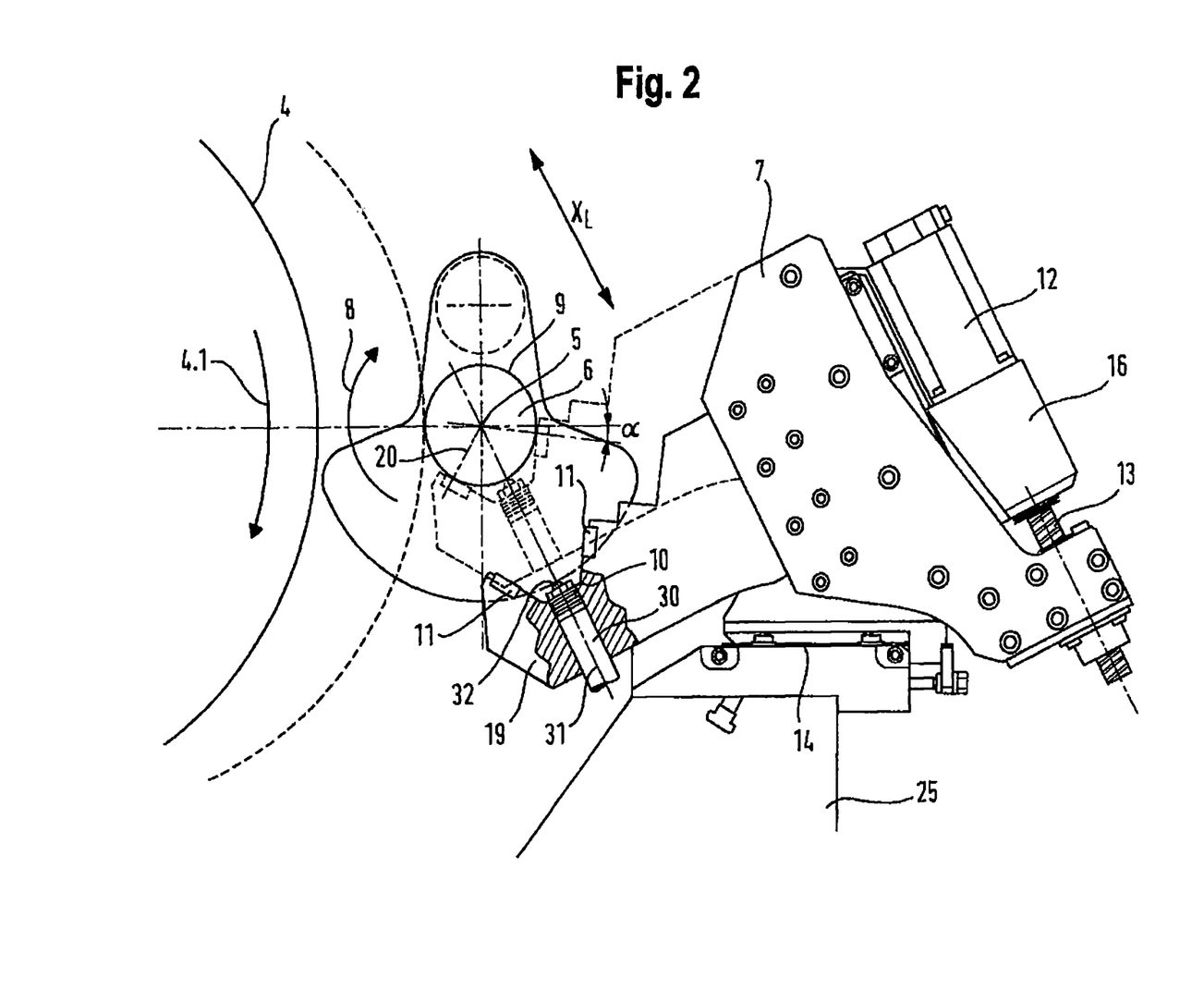
FIG. 2 illustrates an enlarged detail view of a crankshaft being ground, with a measuring steady rest according to the present invention in the retracted position (solid lines) and supporting position (dotted lines)

FIG. 2 shows an enlarged detail view of the grinding machine according to FIG. 1, in which the grinding disc 4, with the direction of rotation 4.1 thereof, is fed in from the retracted position thereof (solid line) in order to grind in the engaged position thereof (dashed line) with the workpiece 6 in the form of a main bearing of a crankshaft. The central longitudinal axis 5 of the central bearing journal of the workpiece 6 runs parallel to the axis of rotation of the grinding disc 4. The measuring steady rest 7 is brought onto the grinding table 25. The measuring steady rest 7 has, on the steady rest arm 19 thereof, a recess that is configured as a prism with supporting parts 11 thereof mounted onto lateral flanks 22 (see FIG. 3) thereof. The measuring steady rest 7 is arranged on the grinding table 25 such that the supporting lines 20 (see the dashed representation of the measuring steady rest 7) formed by the supporting parts 11 on contact thereof against the bearing point 9 are arranged under the workpiece center with the right supporting part 11 thereof represented in the drawing at an angle $\alpha$ of 7°. This means that the supporting prism of the measuring steady rest 7 is arranged overall below center in the engaged position thereof with the workpiece 6 to be supported, with respect to the central longitudinal axis 5 of the workpiece and the grinding disc rotational axis, which lie on one plane. The angle $\alpha$ of 7° has proven advantageous during grinding because the workpiece region 9 to be supported is never exactly 100% round. By means of this sub-centric positioning of the direct support of the workpiece region 9 that is to be ground, the circularity defects at this bearing point are not continually reproduced at the bearing point that is to be ground while it is being ground, as is the case in the prior art with support with respect to engagement of the grinding disc, i.e., when the support of the bearing point lies in the same plane as the one formed by axis of rotation of the grinding disc and the central longitudinal axis 5 of the workpiece with respect to the angle bisector between the two supporting parts.

The measuring steady rest 7 is moved on the CNC-controlled infeed axis (XL axis) thereof between the retracted position (solid line) thereof and the engaged position (dashed line) thereof. The movement of the steady rest arm 19 with supporting parts 11 arranged on the lateral flanks 22 of the prism 10 comprises, within the region of the base of the prism, a measurement device 30 having a probe pin 32 that can be moved along the angle bisector, configured between the lateral flanks 20 of the prism 10, with the longitudinal axis 31 thereof relative to the movement of the measuring steady rest or the steady rest arm 19 thereof. A probe pin 32 is provided for abutting directly against the surface of the workpiece region 9 to be measured, so that the measurement device 30 can measure the diameter of the workpiece region to be measured and determines a corresponding measurement signal both when the prism is abutted against the workpiece region and when the prism has not yet been abutted against the workpiece region 9. The different variants and instances of use of the measurement prism necessitate that the prism be stable and rigid enough to be able to absorb the correspondingly high support forces of the two-point steady rest. It has now surprisingly been show that the, in contrast, quite sensitive measurement 30 can be nevertheless be arranged directly in the region of the measuring steady rest or integrated thereinto without the measurement device being negatively affected by the considerable support forces. Arrangement in the region of the base of the prism of the measuring steady rest ensures a certain protection for the sensitive measurement device, and yet enables direct measurement of the diameter values of the workpiece region that is to be ground or has been ground, so that such a measuring steady rest enables reliable support and yet also enables in-process measurement. Moreover, the two-point steady rest also surprisingly ensures that bearing points having circularity defects that are in part significantly less than 1 $\mu$m can be ground with such an arrangement of the prism. These low circularity defects are also achievable, inter alia, for the reason that the measuring steady rest has, on the one hand, high rigidity and, on the other hand, the advantage of the movement thereof on an also CNC-controlled infeed axis, the XL axis. Thus, that is to say, the steady rest arm 19 can be fed in with the prism 10 or the prism-shaped support and the actual supporting parts under defined conditions on a defined movement path against the workpiece region 9 to be supported. The infeed, realized by a threaded spindle 13, of the steady rest against the workpiece region to be supported exactly along the angle bisector ensures that the center of the workpiece region 9 is held in a defined manner in the direction of the infeed axis of the grinding disc 4. The movement of the support prism 10 along the CNC-controlled XL axis on the angle bisector is ensured by means of a servomotor 12 that acts via a coupling (not shown) arranged in a housing on the threaded spindle 13, preferably in the form of a circulating ball spindle, provided in order to feed in the support prism 10 from the retracted position into the supporting position. The measuring steady rest is fastened to the grinding table 25 by means of a holder having a dovetail guide 14. The supporting parts 11 arranged on the lateral flanks 20 of the prism 10 are configured as CBN- or PCD-coated plates that are in direct contact with the workpiece region 9 of the workpiece 6 in the supporting position of the measuring steady rest 7. This means that the workpiece regions 9 of the workpiece 6 slide theoretically in line contact on these supporting parts 11. The advantage of the aforementioned materials for the supporting parts is that they have a high wear resistance.

Figure 3:
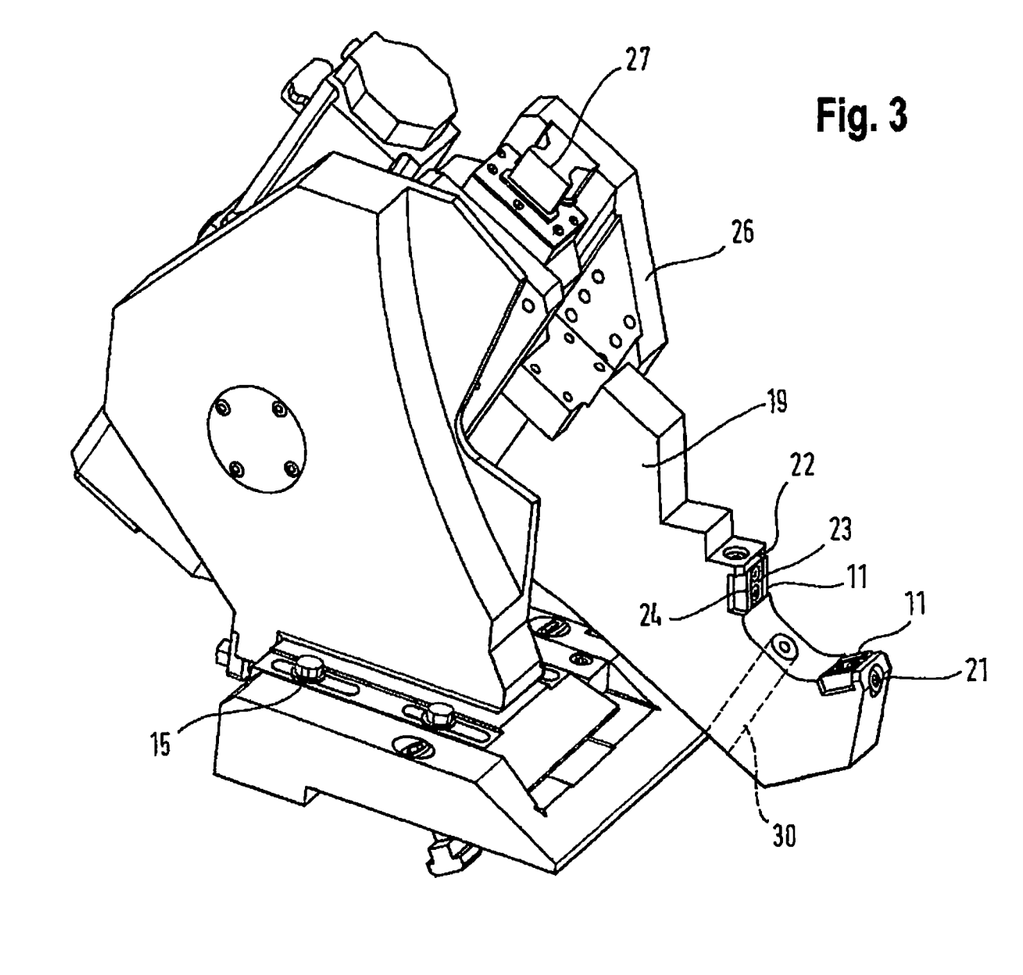
FIG. 3 illustrates a three-dimensional view of the measuring steady rest according to the present invention according to FIG. 2.

FIG. 3 shows a three-dimensional representation of the relatively compact assembly of the measuring steady rest. The measuring steady rest is fastened to the grinding table 25 (not shown) by means of clamping screws 15. The steady rest arm 19 can be displaced along the XL infeed axis of the measuring steady rest toward the workpiece region 9 to be measured along a guide rail 27, by means of a guide carriage 26. FIG. 3 shows, according to this embodiment, the actual measuring steady rest configured as a prism 10, which has lateral flanks 22 on which supporting parts 11 are respectively mounted, wherein the measuring steady rest is configured to have a V-shape and the measurement device 30 is shown in the bottom region or base of the prism 10. This basic representation in FIG. 3 shows that the arrangement of the measurement device 30 in the base of the support prism constitutes a relatively protected position for the sensitive measurement device 30.

In this embodiment, the supporting parts 11 are represented in detail. It is readily seen that the supporting parts 11 extend beyond the surface of the lateral flanks 22 of the prism 10, i.e., in the direction into the interior of the prism, so that the supporting parts 11 can ensure the corresponding supporting contact on placement against the workpiece 6 to be supported, currently being ground, by means of line contact on the supporting lines 20. The supporting parts 11 are releasably fastened to a pivot pin that ensures a pendulum movement of the respective supporting part 11 about a pendulum axis 21 or pivot axis. The advantage of such a swinging accommodation of the supporting parts 11 is that workpiece regions 9 to be supported, optionally configured so as to be inexactly or deliberately not cylindrical, ensure a constant, reliable, and exactly defined placement of the respective supporting part 11 on this bearing point to be supported, i.e., against the surface thereof. This swinging bearing of the supporting parts 11 prevents one or more edges of the supporting part 11 from digging in, so to speak, into the surface of the workpiece to be supported in the event of certain deviations in the bearing surface from an exactly cylindrical shape. The supporting parts have two support regions that are arranged on the sides of the platelet-shaped supporting part 11 and are separated from one another by a so-called center groove 23. The advantage of such a configuration is that the center groove 23 creates, for each supporting part 11, two separate supporting regions or supporting sections 24, which ensure reliable support but, at the same time, form only short line contact, so that the impact of placing the steady rest against an already-ground region of a workpiece region 9 is further reduced.

Figure 4:
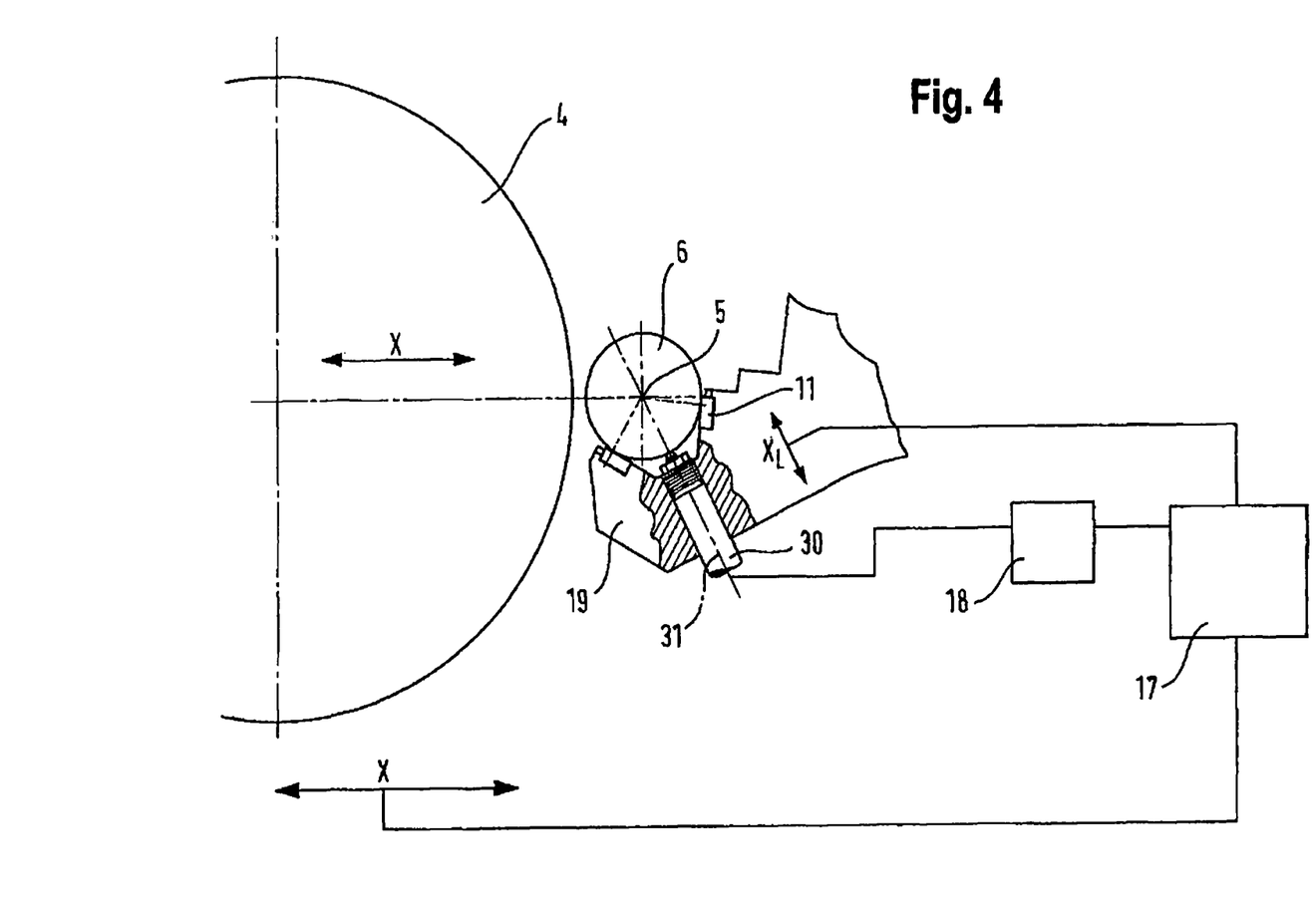
FIG. 4 illustrates a basic side view of the measuring steady rest according to the present invention in placement against the workpiece to be machined, with retracted grinding disc and connected control circuit for adjusting the measuring steady rest.

FIG. 4 shows, with the grinding disc 4 retracted, a measuring steady rest placed against and supporting the central workpiece region 9 of the workpiece 6, wherein, at the same time, the measurement device 30 probes so as to measure the surface of the workpiece 6 with the probe pin 32 thereof, the probe pin advantageously being spring-loaded. The infeed axis of the grinding disc 4 is represented by the X-axis depicted by the double attack, while the CNC infeed axis of the measuring steady rest is marked by the double arrow depicted by XL.

FIG. 4 shows a measurement computer 18 and a control device 17, by means of which a control circuit is formed, by means of which a measuring steady rest adjustment is made possible. The infeed axis of the measuring steady rest XL and the infeed axis of the grinding disc X are both CNC-controlled. This ensures that these two CNC infeed axis can be moved interdependently. This interdependence makes it possible to move both in exactly prescribed, defined, and intended interdependence. If, namely, the accuracy of the machining result is to be still further increased, then this can be used, for example, additionally through the measurement realized simultaneously with the support at the central workpiece region 9 of the workpiece region 6 to further improve the accuracy of the tracking of the measuring steady rest to the infeed of the grinding disc 4. Thus, the measuring steady rest 7 according to the present invention method realized therewith on the grinding machine according to the present invention make it possible to measure the unfinished diameter of the central workpiece region 9 before the support thereof, and to measure during the grinding, and also measure the finished bearing diameter.

Figure 5:
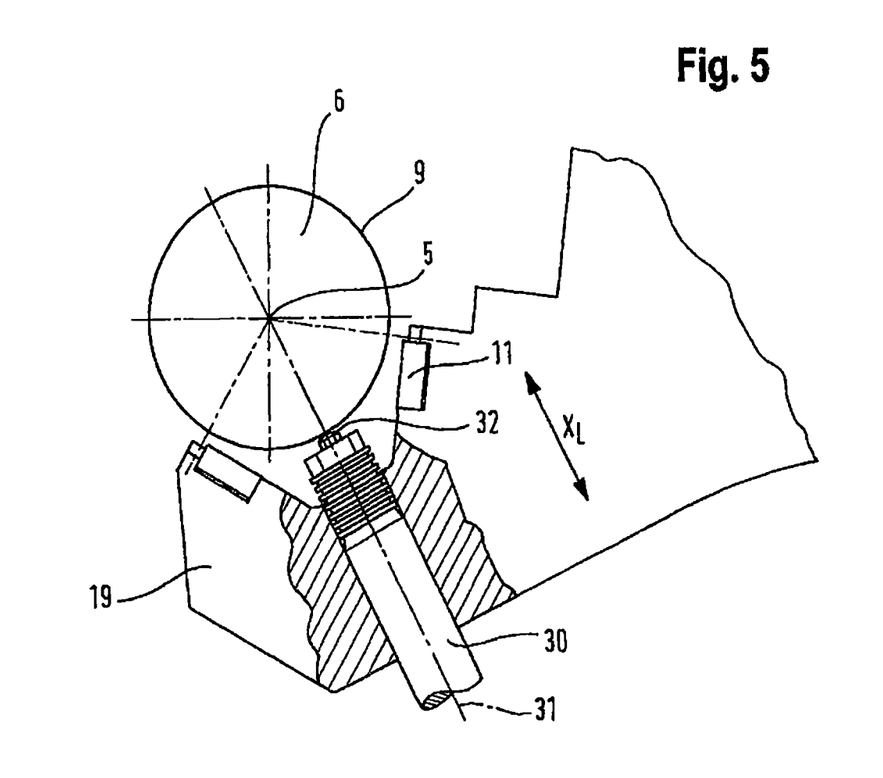
FIG. 5 illustrates a basic detail view of the measuring steady rest according to the present invention, with the measurement device having approached the workpiece region, but the supporting parts of the measuring steady rest having not yet approached the workpiece region.

FIG. 5 shows a position of the support prism that is retracted relative to the surface of the workpiece region 9 of the workpiece 6, wherein, however, the probe pin 32 of the measurement device 30 is in contact with the surface to be measured of the workpiece 6. As already shown, the measuring steady rest is moved along the infeed axis XL along the angle bisector through the central longitudinal axis 5 of the workpiece 6, on which the longitudinal axis 31 of the measurement device 30 is aligned with the probe pin 32 thereof. The position of the measuring steady rest depicted in FIG. 5 represents a simplified solution of the measurement of such central bearing points, namely, one where the probe pin 32 of the measurement device 30 abuts against the surface of the workpiece 6 without the supporting parts of the prism abutting against the diameter to be measured of the workpiece. This preferably entails the unfinished diameter of the workpiece on this central bearing point. Such a measurement before abutment and support of the supporting parts of the measuring steady rest at the workpiece 6 has an advantage in that it is possible to more quickly measure the unfinished part diameter of the workpiece region, wherein, however, the inaccuracies on the workpiece 6 that arise from the deflection of the shaft and optionally also from heat transitions from the machine are deliberately not collected. Measuring the unfinished diameter before the immediate support has an advantage in that with subsequent steps of the support, the corresponding placement forces and support forces of the measuring steady rest 7 against the workpiece region 9 to be ground can be optimally adjusted, wherein the measuring steady rest 7 can also be optimally tracked to the grinding progress.

According to the indicated positions of the measurement device 30 and actual position of the measuring steady rest according to FIG. 5, however, it is also possible—as depicted in FIG. 5—for the measurement device 30 with the probe pin 32 to first be moved toward the surface of the workpiece 6, and then the actual steady rest, i.e., the prism with the supporting parts 11 to be fed in along the XL axis of the measuring steady rest against the bearing point until the measurement value determined with the measurement device 30 no longer changes. This is ensured if the two supporting parts 11 of the prism 10 abut against the workpiece 6. This makes it possible again to measure the exact diameter of the bearing point. According to this improved method, it is again possible to adjust the infeed axis XL of the measuring steady rest 7 to a precise target value. With such a solution, it is thus possible to eliminate or at least partially compensate for the errors from the heat transitions of the machine and from the deflection of the workpiece as a result of the weight thereof. In the variant illustrated in FIG. 5, with the gradual approach of the measuring steady rest 7 toward the surface to be supported, work is done in any case without overpressure on the workpiece region 9, in order to measure the actual value of the bearing diameter.

Figure 6:
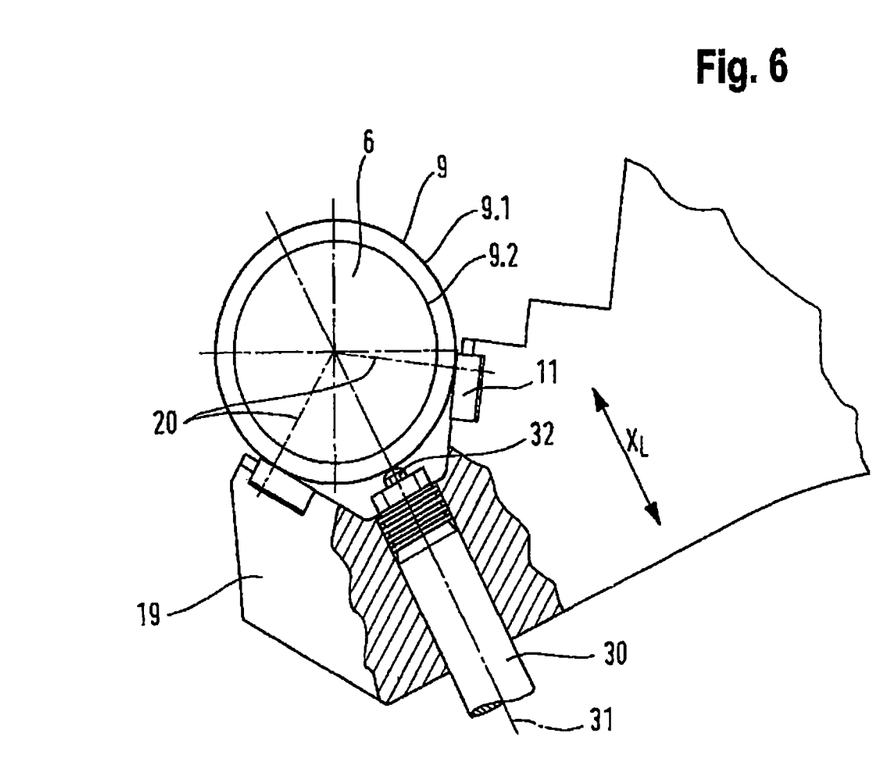
FIG. 6 illustrates a detail view as in FIG. 5, but with the supporting parts of the measuring steady rest having approached an unfinished contour of the workpiece region.

FIG. 6 depicts a position of the measuring steady rest wherein the supporting parts 11 of the prism 10 of the measuring steady rest 7 and also the measurement device 30 with the probe pin 32 thereof abut against an unfinished contour 9.1 of the workpiece region 9 of the workpiece 6. It is again shown that the measuring steady rest 7 runs along the angle bisector through the central longitudinal axis 5 of the central workpiece region 9, wherein the relative motion of the probe pin 32 of the measurement device 30 is aligned to the angle bisector with respect to the longitudinal axis 31 thereof. In principle, a prism-shaped steady rest has a "disadvantage" in not being self-centering, i.e., in not automatically adapting to the diameter of the bearing point. Still preparing the most precise bearing diameter possible requires measuring the bearing diameter when the steady rest has been placed thereagainst. The position depicted in FIG. 6 is used now therefor. The measuring steady rest 7 is here first placed against the central workpiece region 9, i.e., the bearing point on the theoretical dimension. In order to ensure that both supporting parts 11 securely abut against the surface of the unfinished contour 9.1 of the workpiece region 9 of the workpiece 6, the steady rest is placed with such a force against this workpiece region 9 to be machined and to be supported that this region is "overpressed" by a defined amount, whereby the workpiece is deflected by just this low amount through the measuring steady rest in the direction of the infeed of the prism 10 of the measuring steady rest. Thereby, the two supporting parts of the prism 10 of the measuring steady rest 7 and the probe pin 32 of the measurement device 30 abut in a process-secure manner against the workpiece region 9, thus making it possible to measure the exact diameter of this workpiece region 9. After the diameter of the central workpiece region 9 has been exactly measured, the measuring steady rest 7 is then retracted again somewhat along the infeed axis XL, i.e., fed in to the current workpiece diameter of the central workpiece region 9. So that just such an exact infeed of the measuring steady rest can be realized, the infeed axis XL thereof is configured as a CNC-controlled axis.

After the actual diameter (unfinished part diameter) of the workpiece 6 at the workpiece region 9 has been determined exactly, the measuring steady rest 7 is fed in to the exact predetermined desired support position thereof. This is achieved through the infeed over the CNC-controlled XL axis, wherein the CNC-controlled axes of the measuring steady rest 7 and the grinding disc are each provided with a bearing control circuit. The measuring steady rest is then tracked up to the finished dimension 9.1. If a plurality of main bearing points, i.e., central workpiece regions are present, for example, as with a crankshaft, each individual measuring steady rest can be correspondingly adapted according to the measure of the bearing diameter. With this approach, i.e., with this method for measuring the unfinished part bearing diameter, it is also possible to compensate for deviations from circularity errors from the pre-machining and the deflection of the clamped workpiece, due to the weight thereof.

The representations according to FIG. 5 and according to FIG. 6 allow basically three different variants, which shall be described hereinbelow with reference to a specific example. For example, let the bearing diameter to be ground be a diameter of 100 mm. The unfinished part measurement or measurement from pre-machining should be, for example, 0.5 mm. Let ±0.1 mm be taken as the tolerance. Thus, the upper tolerance measure is 100.6 mm and the lower tolerance measure is 100.4 mm. At the start of the process, it must be noted that when the measuring steady rest is placed against an unfinished dimension of a bearing point to be measured and to be supported, the diameter thereof is not yet known. It would thus be possible for there to be overpressure against some central bearing points, while no supporting contact of the measuring steady rest takes place at all against other bearing points, if an infeed is being carried out on the basis of a theoretical value. It should be noted, in any case, that in the presence of a plurality of central bearing points and with the use of measuring steady rests present in accordance with the number of bearing points, each steady rest moves inaccurately at the first approach thereof toward the bearing point to be supported at a measured diameter. According to a first variant wherein the circularity is allowed as an error and also deflection and heat transitions in the machine are not taken into account, but a corresponding unfinished diameter is measured as a reference value, FIG. 5 shows that, namely, the measurement device 30 measures the unfinished diameter 9.1 without any support by the measuring steady rest. Thus, a suitable reference diameter can be obtained.

According to a second variant, the measuring steady rest 7 is slowly fed in on this basis with a placed probe pin 32 of the measurement device 30, i.e., until the supporting parts 11 abut against the unfinished contour 9.1 of the workpiece 6 at the workpiece region 9 and the measurement value no longer changes. This position is depicted in FIG. 6.

Finally, there is a third variant wherein there is no prior measurement without a support where much more immediately the measuring steady rest 7 is moved immediately to the minimum dimension on the basis of the tolerance to the measurement. This ensures that each measuring steady rest 7 is at least in supporting action at the respective support point, when there may be slight overpressure in some places. This means that no overpressure is present solely at the central workpiece regions at which precisely the minimum measure—i.e., the lower tolerance measure—is observed. Present at all other central workpiece regions to be supported is a more or less strong overpressure corresponding to the actual dimension with which the minimum dimension is exceeded.

Figure 7:
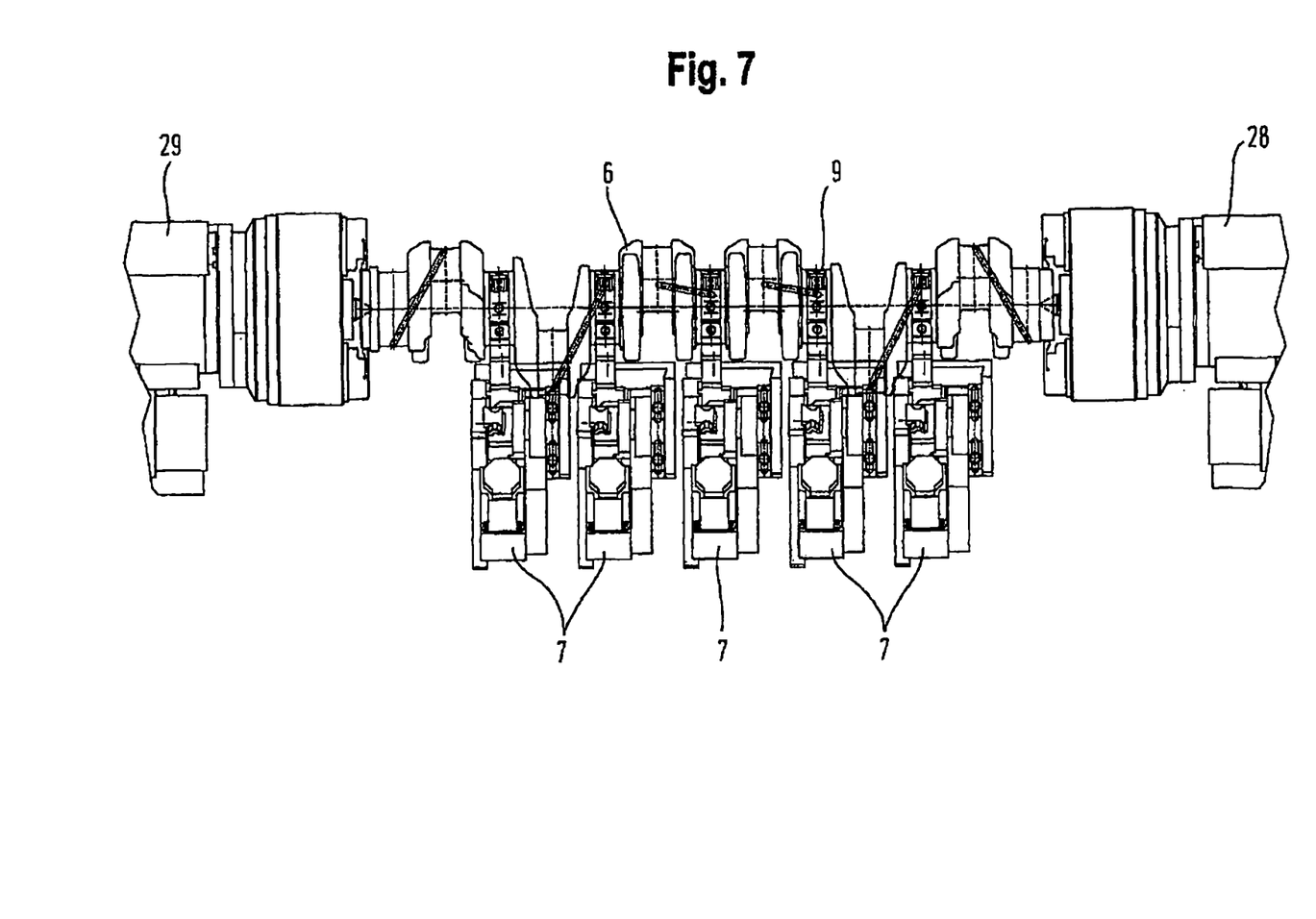
FIG. 7 illustrates a crankshaft that is clamped between a tailstock and headstock, and that is supported at main bearings thereof each with a measuring steady rest according to the present invention.

Finally, FIG. 7 depicts a workpiece 6—in the form of a crankshaft having central workpiece regions 9—clamped between a workpiece headstock 29 and a tailstock 28, on each of which a measuring steady rest 7 has been placed. That is to say, measuring steady rests 7 are placed against all five bearing points. Depending on the configuration of the crankshaft or other workpiece, a different number of measuring steady rests 7 therefrom will optionally be required. It is, however, also conceivable—with appropriately more stable workpieces or more stable crankshafts—that possibly only the measuring steady rests 1, 3, 5 are put to use, counting from left to right in FIG. 7. In a known manner, the workpiece is accommodated on mounting tips, in each case on the workpiece headstock side and tailstock side, and driven to radial entrainment on both sides with a C-axis.

Figure 8:
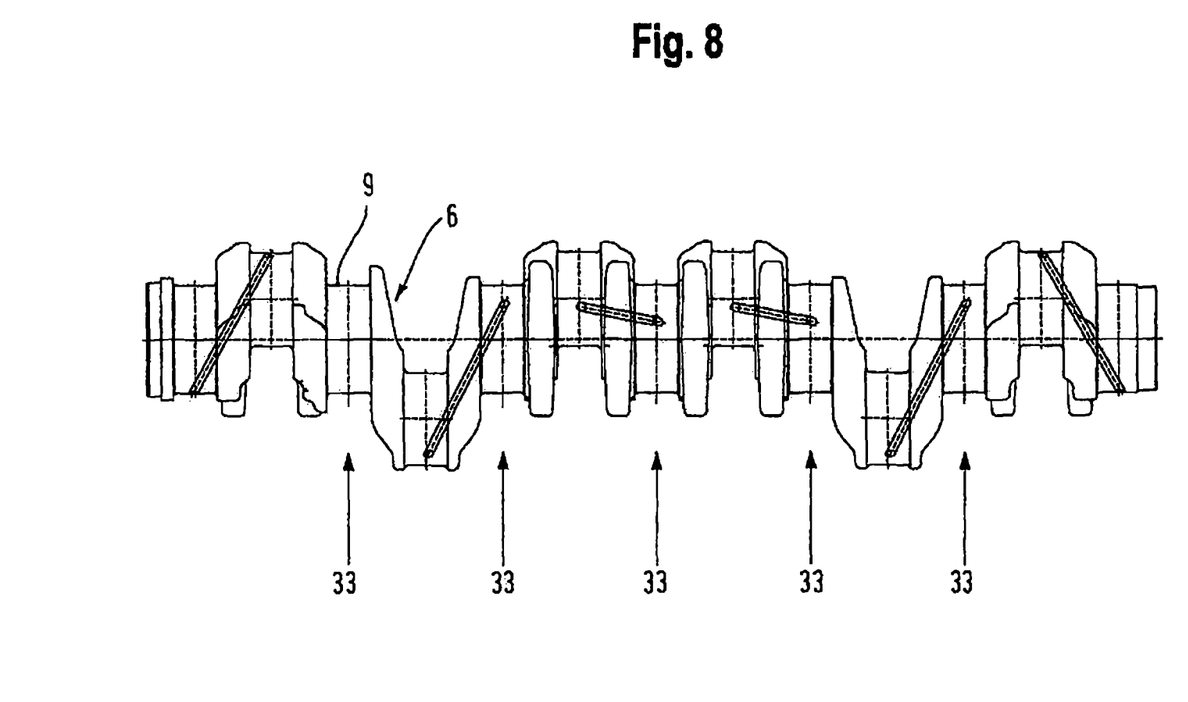
FIG. 8 illustrates a crankshaft according to FIG. 7, with which the respective main bearings for supporting with a measuring steady rest are marked with arrows for the sake of clarity.

Finally, FIG. 8 depicts a crankshaft 6, wherein the main bearing 33 is represented solely by arrows. Starting from the left, steady rests are provided, i.e., on the main bearings 2 to 6, wherein the infeed can be carried out against the unfinished part diameter. Generally, it is assumed that both the unfinished part diameter and the diameter from any pre-machining that may be present are different, because it is not possible to finish these to exactly the same target dimension. Because each bearing point generally has a different actual size from the others and it is assumed that this actual size lies within the allowable manufacturing tolerance, this thus means that the aforementioned measure of the respective bearing point and support against each central workpiece region must be performed by the respective measuring steady rest 7 in order to produce high-precision bearing points.

The invention claimed is:

1. A measuring steady rest for supporting and measuring central workpiece regions the measuring steady rest comprising:
    an integrated measurement device for direct advancement against and measurement of the central workpiece regions before and during the machining of central and eccentric workpiece regions, which can be brought from a retracted position in order to grind and into a support position against the central workpiece region in order to support the central workpiece region, and which has at least two supporting parts that can be fed in against the central workpiece region and support the central workpiece region at respective peripheral regions that are spaced apart from one another,
    the supporting parts being arranged so as to form an opening angle with respect to each other at each lateral flank of a prism at a steady rest arm, in a fixed position with respect to one another and with respect to the steady rest arm and in the supporting position subcentric to the longitudinal axis of the central workpiece region, such that an angle bisector formed between both supporting parts manifests a fixed acute angle with respect to the perpendicular running through the longitudinal axis of the central workpiece region, and a CNC-controlled infeed of the steady rest arm to the central workpiece region takes place along this angle bisector, on which the measurement device is arranged with regard to the longitudinal axis thereof.

2. The measuring steady rest according to claim 1, wherein the steady rest arm is movable between the retracted and the supporting position by means of just one servomotor operating on a threaded spindle.

3. The measuring steady rest according to claim 1, wherein the measurement device is movable independently of the CNC-controlled infeed of the steady rest arm.

4. The measuring steady rest according to claim 1, wherein the measurement device has a probe pin that is arranged so as to be movable in a manner corresponding to the contact thereof with the central workpiece region to be measured, in the longitudinal axis of the measurement device for recording a measurement value on the angle bisector relative to the CNC-controlled infeed.

5. A grinding machine for grinding central and eccentric workpiece regions on workpieces the grinding machine comprising:
   a measuring steady rest comprising:
      an integrated measurement device for direct advancement against and measurement of the central workpiece regions before and during the machining of central and eccentric workpiece regions, which can be brought from a retracted position in order to grind and into a support position against the central workpiece region in order to support the central workpiece region, and which has at least two supporting parts that can be fed in against the central workpiece region and support the central workpiece region at respective peripheral regions that are spaced apart from one another,
      the supporting parts being arranged so as to form an opening angle with respect to each other at each lateral flank of a prism at a steady rest arm, in a fixed position with respect to one another and with respect to the steady rest arm and in the supporting position sub-centric to the longitudinal axis of the central workpiece region, such that an angle bisector formed between both supporting parts manifests a fixed acute angle with respect to the perpendicular running through the longitudinal axis of the central workpiece region, and a CNC-controlled infeed of the steady rest arm to the central workpiece region takes place along this angle bisector, on which the measurement device is arranged with regard to the longitudinal axis thereof; and
   a control device by means of which the measuring steady rest can be placed against the central workpiece region and a grinding disc can be fed in up to the finished dimensions of the central workpiece region by means of the CNC control thereof before and during grinding performed by means of the grinding disc or after the grinding of the central workpiece region, wherein the measuring steady rest is configured as a support prism and such that the also CNC-controlled infeed movement onto the central workpiece region to be supported occurs along the angle bisector of the opening angle of the support prism, on which is arranged the measurement device that is aligned to the angle bisector with respect to the longitudinal axis thereof.

6. The grinding machine according to claim 5, wherein the measurement device transmits measurement signals of the diameter of the central workpiece region for the infeed position of the measuring steady rest against the bearing point to the control device, on the basis of which measurement signals the infeed positions of the measuring steady rest are controlled.

7. The grinding machine according to claim 5, wherein the control device controls the X-axis position of the grinding disc on the basis of the measurement signals.

8. The grinding machine according to claim 5, wherein the measurement device takes place along the angle bisector relative to the infeed movement of the measuring steady rest.

9. The grinding machine according to claim 5, wherein the CNC-controlled infeed of the grinding disc is performed synchronously with that of the measuring steady rest.

10. The grinding machine according to claim 5, wherein the measuring steady rest can be tracked by means of the control device to the X-axis position of the grinding disc.

11. The grinding machine according to claim 5, wherein the angle bisector forms such an angle to the perpendicular that resulting forces applied during the grinding press the workpiece region into the support prism in a position-fixing manner at the supporting parts.

12. The grinding machine according to claim 5, wherein the support position is an end position of the infeed and the support prism, in the end position, abuts against a finish-ground central workpiece region.

13. A method for supporting and measuring central workpiece regions, before and during the machining of central and eccentric workpiece regions by means of a grinding disc, which has an infeed axis CNC-controlled by a control device, the method comprising:
   providing a grinding machine comprising a measuring steady rest and a control device,
      the measuring steady rest comprising an integrated measurement device for direct advancement against and measurement of the central workpiece regions before and during the machining of central and eccentric workpiece regions, which can be brought from a retracted position in order to grind and into a support position against the central workpiece region in order to support the central workpiece region, and which has at least two supporting parts that can be fed in against the central workpiece region and support the central workpiece region at respective peripheral regions that are spaced apart from one another, the supporting parts being arranged so as to form an opening angle with respect to each other at each lateral flank of a prism at a steady rest arm, in a fixed position with respect to one another and with respect to the steady rest arm and in the supporting position sub-centric to the longitudinal axis of the central workpiece region, such that an angle bisector formed between both supporting parts manifests a fixed acute angle with respect to the perpendicular running through the longitudinal axis of the central workpiece region, and a CNC-controlled infeed of the steady rest arm to the central workpiece region takes place along this angle bisector, on which the measurement device is arranged with regard to the longitudinal axis thereof, and
      the control device being the means by which the measuring steady rest can be placed against the central workpiece region and a grinding disc can be fed in up to the finished dimensions of the central workpiece region by means of the CNC control thereof before and during grinding performed by means of the grinding disc or after the grinding of the central workpiece region, wherein the measuring steady rest is configured as a support prism and such that the also CNC-controlled infeed movement onto the central workpiece region to be supported occurs along the angle bisector of the opening angle of the support prism, on which is arranged the measurement device that is aligned to the angle bisector with respect to the longitudinal axis thereof;

bringing a measurement device into contact with the central workpiece region to be measured, at the measuring steady rest arranged on the steady rest arm, on the grinding machine, by means of a CNC axis of the steady rest arm; and measuring the still not yet machined, partially machined, or finished central workpiece region.

14. The method according to claim 13, wherein the measuring steady rest is placed with the supporting parts arranged in the prism on the central workpiece region to be supported in such a manner that this central workpiece region is overpressured by a sum defined with respect to the central longitudinal axis of the shaft part, and thereafter the measuring steady rest supports the central workpiece region on the current diameter thereof.

15. The method according to claim 13, wherein the measuring steady rest, after measuring the central workpiece region, is retracted by such a small sum on the CNC axis thereof that the measuring steady rest supports the central workpiece region on the current diameter thereof without overpressure.

16. The method according to claim 13, wherein the measuring steady rest is tracked by means of a control device on the basis of measurement signals provided thereto by the measurement device to the current diameter of the central workpiece region, up to the finished dimensions thereof.

17. The method according to claim 13, wherein an additional circularity correction to the actual infeed value of the grinding disc, in the manner of an overlay, is embossed by means of the control device on the CNC-controlled X-axis of the grinding disc.

18. The method according to claim 13, wherein the measuring steady rest—with a non-rotating shaft part—is moved on the CNC axis of the steady rest arm thereof toward the central workpiece region to be machined to such an extent that the measurement device measures a measurement signal of the diameter of the central workpiece region, without the measuring steady rest supporting the central workpiece region, which measurement signal is transmitted to the control device.

19. The method according to claim 13, wherein the measuring steady rest—with a rotating shaft part—is moved on the CNC axis of the steady rest arm thereof with a moderate infeed toward the central workpiece region to be machined to such an extent that the central workpiece region is supported and the measurement signal of the measurement device no longer changes, and then the measurement signal is transmitted to the control device.

20. The method according to claim 13, wherein the measuring steady rest—with a rotating shaft part—is fed in on the CNC axis of the steady rest arm thereof toward the central workpiece region to be machined as far as a predetermined lower tolerance limit thereof, and the measurement device only measures the diameter of the central workpiece region when this placement position is achieved, and transmits the measurement signal corresponding to this diameter to the control device.

21. The method according to claim 19, wherein (a) the measuring steady rest—with a rotating shaft part—is moved on the CNC axis of the steady rest arm thereof with a moderate infeed toward the central workpiece region to be machined to such an extent that the central workpiece region is supported and the measurement signal of the measurement device no longer changes, and then the measurement signal is transmitted to the control device, only after the measuring steady rest—with a non-rotating shaft part—is moved on the CNC axis of the steady rest arm thereof toward the central workpiece region to be machined to such an extent that the measurement device measures a measurement signal of the diameter of the central workpiece region, without the measuring steady rest supporting the central workpiece region, which measurement signal is transmitted to the control device.

* * * * *